United States Patent
Allgaier et al.

(10) Patent No.: US 8,928,285 B2
(45) Date of Patent: Jan. 6, 2015

(54) CHARGING OF SECONDARY CELLS (ACCUMULATORS) WITH REGULATED INPUT CURRENT

(75) Inventors: Volker Allgaier, Haslach (DE); Andreas Isenmann, Haslach (DE); Karl Griessbaum, Muehlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 401 days.

(21) Appl. No.: 13/454,633

(22) Filed: Apr. 24, 2012

(65) Prior Publication Data

US 2013/0106358 A1    May 2, 2013

Related U.S. Application Data

(60) Provisional application No. 61/482,909, filed on May 5, 2011.

(30) Foreign Application Priority Data

May 5, 2011   (EP) .................................... 11164940

(51) Int. Cl.
| | |
|---|---|
| *H02J 7/00* | (2006.01) |
| *H02J 7/16* | (2006.01) |
| *H02J 7/04* | (2006.01) |
| *H02J 7/06* | (2006.01) |
| *H02J 7/24* | (2006.01) |

(52) U.S. Cl.
CPC .............. *H02J 7/007* (2013.01); *H02J 7/0068* (2013.01)
USPC ........... 320/128; 320/132; 320/134; 320/135; 320/136; 320/137; 320/162; 320/163; 320/164; 320/165; 424/426; 424/429

(58) Field of Classification Search
USPC ................. 320/128, 132, 134–137, 162–165; 424/426, 429
See application file for complete search history.

(56) References Cited

U.S. PATENT DOCUMENTS

| | | | |
|---|---|---|---|
| 3,736,490 A * | 5/1973 | Fallon et al. .................... | 320/143 |
| 5,714,869 A * | 2/1998 | Tamechika et al. ........... | 320/101 |
| 2003/0126474 A1 | 7/2003 | Sawyers et al. | |
| 2004/0119444 A1* | 6/2004 | Faure et al. .................... | 320/134 |
| 2005/0017693 A1 | 1/2005 | Solie et al. | |
| 2007/0153442 A1* | 7/2007 | Guenter et al. ............... | 361/93.1 |
| 2010/0156183 A1 | 6/2010 | Kah et al. | |
| 2010/0180954 A1* | 7/2010 | Hagler ............................ | 137/14 |
| 2011/0101778 A1* | 5/2011 | Yang ................................ | 307/52 |
| 2011/0148357 A1* | 6/2011 | Lu .................................. | 320/111 |
| 2012/0198540 A1* | 8/2012 | Faist et al. ...................... | 726/10 |
| 2013/0038274 A1* | 2/2013 | Forsythe ........................ | 320/107 |

FOREIGN PATENT DOCUMENTS

EP        2 202 598         6/2010

* cited by examiner

*Primary Examiner* — Stacy Whitmore
(74) *Attorney, Agent, or Firm* — Fay Kaplun & Marcin, LLP

(57) ABSTRACT

Stated is a charging-current regulating device for charging an energy storage device for a field device, and for regulating a charging current for the energy storage device, wherein regulating the charging current for the energy storage device takes place in such a manner that a limiting value relating to an input current of the field device is not exceeded. Regulating the charging current may take place in such a manner that energy storage takes place as quickly as possible and without overloading an input protection circuit of the field device.

10 Claims, 2 Drawing Sheets

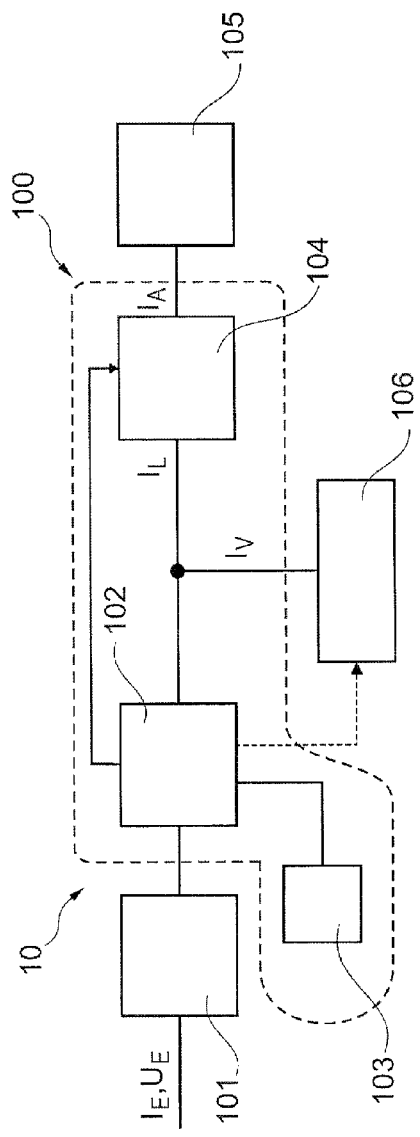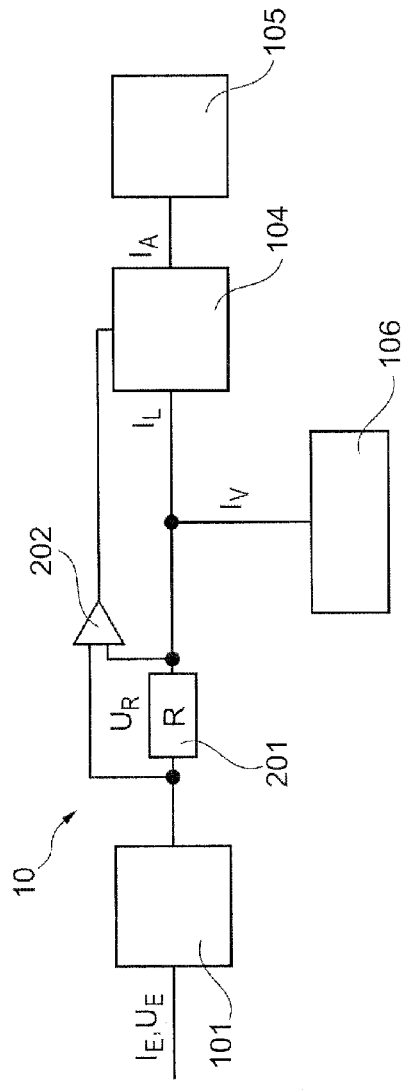

CHARGING OF SECONDARY CELLS (ACCUMULATORS) WITH REGULATED INPUT CURRENT

REFERENCE TO RELATED APPLICATIONS

This application claims the benefit of the filing date of EP Patent Application Serial No. EP 11 164 940.6 filed 5 May 2011 and U.S. Provisional Patent Application Ser. No. 61/482,909 filed 5 May 2011, the disclosure of both application are hereby incorporated by reference.

FIELD OF THE INVENTION

The present invention relates to the supply of power to field devices. In particular, the present invention relates to a charging-current regulating device for regulating an input current of a field device and for regulating a charging current for charging an energy storage device for the field device, to a field device with a charging-current regulating device, and to a method for regulating a charging current for charging an energy storage device for a field device.

BACKGROUND

Field devices are, for example, used in measuring and automation engineering. In order to be prepared independently of an electricity supply by way of an electricity grid or for the case of a power outage, field devices may comprise an energy storage device that makes it possible to operate the field device independently of an electricity supply by way of an electricity grid. The term "energy storage device" may, for example, refer to rechargeable batteries.

In particular, the term "energy storage device" may refer to rechargeable batteries which during operation of the field device are charged by way of an electricity grid.

SUMMARY OF THE INVENTION

In field devices the input current load is limited, for example, by protective circuits for measures relating to electromagnetic compatibility, or by reverse-polarity protection circuits (hereinafter referred to as "input protection circuits").

Stated are a charging-current regulating device for charging an energy storage device for a field device and for regulating a charging current for the energy storage device, a field device with a charging-current regulating device, as well as a method for regulating a charging current according to the characteristics of the independent claims. Developments of the invention are set out in the subordinate claims and in the following description.

Many of the characteristics described below with reference to the charging-current regulating device may also be implemented as method-related steps and vice versa.

According to a first aspect of the invention, a charging-current regulating device for charging an energy storage device for a field device and for regulating a charging current for the energy storage device is stated, which charging-current regulating device comprises a control unit, a regulating unit and a switching regulator.

In switching regulators for charging circuits for charging rechargeable batteries the input current depends on the input voltage and on the output power. With an increase in the input voltage and with a constant output power of a switching regulator, the input current that is used to charge the energy storage device drops without regulation.

With the drop in the input current of the switching regulator the entire current draw of the field device, which comprises the switching regulator and the charging circuit for the energy storage device, drops so that any input protection circuit in this case is no longer used to capacity. Accordingly, the output power of the switching regulator, on which output power the charging time of the energy storage device depends, can be increased, which results in turn in an increased current draw of the field device so that the input protection circuit of the field device is used to capacity.

In this manner the charging process of the energy storage device, for example of rechargeable batteries, may be accelerated, and at the same time overloading input protection circuits of the field device may be prevented.

The components in the input protection circuit may be designed for the maximum load case. With a specified output power of a switching regulator for a charging circuit this is the case with a low input voltage, because in turn a high input current is necessary in order to attain the specified output power. In contrast to this, the input current of a switching regulator for loading rechargeable batteries drops with an increase in the input voltage and with the output power remaining constant.

In the high input voltage range, which is tantamount to a low input current with a specified output power, an input protection circuit is not used to maximum capacity, and consequently a rechargeable energy storage device that is to be charged, for example rechargeable batteries, may not be charged at the fastest possible rate.

The control unit is used to specify a command variable for the regulating unit. The command variable may, for example, be a maximum-permissible input current for an input protection circuit of the field device. The control unit may be configured manually or in an automated manner in that the command variable is adjusted, for example depending on external parameters, for example an ambient temperature of the field device.

The regulating unit may be designed to regulate the input current of the switching regulator for charging the energy storage device in that from the regulating unit a control variable is transmitted to the switching regulator.

However, the regulating unit can also be designed to transmit a control variable to an electrical consumer of the field device so that the electrical consumer reduces its current draw, and consequently, in turn, the input current of the field device is reduced so that an input protection circuit of the field device is not overloaded, or with the input current remaining constant the charging current may be increased.

The switching regulator may specify an input voltage and an input current for a charging circuit that carries out a charging process of the energy storage device of the field device.

The input current of the electrical consumer and the input current of the switching regulator for charging the energy storage device specify the entire input current of the field device, which input current flows through the input protection circuit of the field device.

Thus the input current of the field device may be regulated in that the regulating unit adjusts the input current of the switching regulator or the input current of the electrical consumer.

By way of the control unit for the regulating unit it may be possible to specify whether and in what manner the input current of the electrical consumer and/or the input current of the switching regulator for charging the energy storage device are/is to be adjusted.

According to a further aspect of the invention, a charging-current regulating device for charging an energy storage device for a field device and for regulating a charging current for the energy storage device without in this process a limiting value relating to an input current of the field device being exceeded is stated. In this arrangement, the charging-current regulating device may comprise a current sensing resistor or a corresponding device, an operational amplifier or a corresponding device and a switching regulator or a corresponding device.

The input current of the field device can flow through the current sensing resistor, and consequently a corresponding voltage drops at the current sensing resistor. The voltage that drops at the current sensing resistor may be used as the input voltage for the operational amplifier. Furthermore, an output value of the operational amplifier can be fed to the switching regulator so that a pick-up current or an output current of the switching regulator can be altered. In this arrangement the switching regulator is controlled by the operational amplifier in such a manner that the pick-up current or the output current of the switching regulator is altered in such a manner that the input current of the field device, which input current flows through the current sensing resistor, does not exceed the limiting value of the input current of the field device.

The input current of the field device or the pick-up current or the output current of the switching regulator represent the variable to be controlled, and thus the controlled variable.

The operational amplifier in conjunction with the current sensing resistor represents a regulator or a regulating unit. The command variable of the regulator is the limiting value of the input current of the field device.

The actual value of the input current of the field device is determined indirectly by way of a dropping voltage on the current sensing resistor, wherein the voltage dropping at the current sensing resistor is caused by the input current of the field device, which input current flows through the current sensing resistor.

From a comparison of the setpoint value of the input current of the field device with the actual value of the input current of the field device, on the operational amplifier an output signal is caused that can serve as a control variable for the current draw of the switching regulator so that from an adjustment of the pick-up current or of the output current of the switching regulator an adjustment of the input current of the field device results.

An output value of the operational amplifier can of course also be fed to an electrical consumer of a field device so that an input current of the electrical consumer is regulated, and consequently the input current of the field device is also adjusted.

A control unit can be connected to the operational amplifier in such a manner that a setpoint value relating to the input current of the field device is specified.

According to a further embodiment of the invention, the operational amplifier is switched as a differential amplifier so that a voltage differential present at two inputs of the operational amplifier is output, weighted by an amplification factor, at an output of the operational amplifier.

The difference between a setpoint value relating to the input current of the field device and the actually measured value of the input current of the field device thus causes the output value of the operational amplifier, which output value serves as the control variable for the current draw of the switching regulator and/or of the electrical consumer of the field device.

According to a further embodiment of the invention, the current sensing resistor is an ohmic resistor.

A charging-current regulating device as described above and below is particularly suitable for use in field devices that are operated with direct current and in a direct voltage range of, in particular, 12 volts, 24 volts or 32 volts.

Of course, operation at any other voltage values and current values may also be possible.

According to a further aspect of the invention, a field device is stated that comprises a charging-current regulating device as described above and below.

According to a further embodiment of the invention, the field device furthermore comprises an input protection circuit, an energy storage device, at least one electrical consumer and a charging circuit.

In this arrangement the input protection circuit represents a limiting factor for an input current load of the field device. In other words, an excessive input current load can result in damage to the input protection circuit.

The energy storage device is designed to supply the electrical consumer with electrical power.

The charging circuit is designed to supply the energy storage device with energy in such a manner that the energy storage device stores the supplied energy, wherein the charging-current regulating device regulates the charging current supplied to the charging circuit.

The input protection circuit can, for example, comprise measures relating to electromagnetic compatibility or measures relating to reverse polarity protection.

Any component can be used as an energy storage device, which component is suitable to store electrical power, in particular in chemical form. In this arrangement, the energy storage device is used to provide energy in order to operate the field device away from access to an electrical grid or in the case of a power outage.

The at least one electrical consumer of the field device can, for example, be a measuring device or an evaluation device for data acquired by a measuring device.

For example, the measuring device can be a fill level sensor, a pressure sensor or a flow sensor. Of course, for example, sensors for any physical size can be in a field device as described above and below.

However, the electrical consumer can also be an evaluation unit that receives a number of acquired values with at least one measured value, and can further process them, for example for transmission to a further evaluation unit, but can also prepare them for subsequent processing.

Of course, the field device as described above and below can also comprise a multitude of electrical consumers, for example a multitude of sensors and/or, for example, a multitude of evaluation units.

The charging circuit is designed to be supplied with energy by the switching regulator of the charging-current regulating device in such a manner that the energy storage device connected to the charging circuit is charged.

In this arrangement the charging-current regulating device regulates the charging current of the charging circuit and the current draw of the at least one electrical consumer so that a maximum-permissible load of the input protection circuit is not exceeded, while the energy storage device is nevertheless charged as quickly as possible.

A charging-current regulating device as described above and below enables the energy storage device to be charged as quickly as possible because the charging current can be regulated depending on the current consumed by the at least one electrical consumer so that at all times the maximum current supply capacity of the field device can be utilized, taking into account the maximum load of the input protection circuit.

According to a further embodiment of the invention, the energy storage device is a unit of rechargeable batteries.

In this arrangement, the unit of rechargeable batteries can comprise at least one rechargeable battery, but also a multitude of rechargeable batteries.

According to a further embodiment of the invention, the electrical consumer of the field device is a fill-level measuring device.

According to a further embodiment of the invention, the electrical consumer of the field device is a flow measuring device.

According to a further embodiment of the invention, the electrical consumer of the field device is a pressure measuring device.

Of course, apart from the measuring devices, the field device as described above and below can also comprise an associated evaluation unit. Furthermore, a field device as described above and below can comprise a multitude of measuring devices, also for various physical sizes.

The evaluation units can obtain the measured values from the measuring devices by way of wireless or wire-bound transmission of data. Of course, the evaluation devices can transmit processed data from the measured values also wirelessly or in a wire-bound manner to further evaluation units.

According to a further embodiment of the invention, the current draw of the electrical consumer can be altered in such a manner that the charging current for the energy storage unit and thus the input current of the field device can follow a specifiable value.

For example, the current draw of the electrical consumer can be regulated depending on the ambient temperature, the input voltage or other external physical values as well as depending on the charge state of the energy storage device.

Regulating the current draw of the electrical consumer can, for example, take place in that a control unit undertakes prioritization of the charging process of the energy storage device by way of the regulating unit.

According to a further embodiment of the invention, the specifiable value relating to the charging current of the energy storage device can be kept constant.

Thereby the current draw of the electrical consumer is also to be kept constant by the regulating unit to the extent that the sum of the charging current and of the current draw of the electrical consumer corresponds to the maximum input current of the field device by way of the input protection circuit.

Of course, both the charging current for the energy storage device and the current draw of the electrical consumer can be regulated in such a manner that the sum of the charging current and of the current draw of the electrical consumer corresponds only to part of the maximum input current of the field device. In order to determine the maximum input current, which can, of course, also vary over time, the control unit can use external parameters, for example the ambient temperature, for regulating the charging current and the current draw of the electrical consumer.

In particular, it may be possible for the maximum load of the input protection circuit to vary with an input current, and for the pick-up of the charging current to be regulated in such a manner that the size of the charging current value follows a varying value of the input current.

According to a further aspect of the invention, a method for regulating a charging current is stated, which method in a first step acquires an input current of a field device, and in a second step regulates a charging current so that the sum of the charging current and of the current draw of an electrical consumer does not exceed a specifiable value relating to the input current.

According to a further embodiment, the method, furthermore, comprises the step of regulating the current draw of an electrical consumer.

Of course, both the charging current and the current draw of the electrical consumer can be regulated individually and/or jointly.

A charging-current regulating device, as described above and below, for charging an energy storage device for a field device measures the input current of the field device and regulates, for example on a clocked charging circuit, the charging current for the energy storage device in accordance with the input current measured. With a constant output power of the charging circuit and a rising input voltage on the charging circuit, a dropping charging current would result, which would lead to a dropping input current of the field device. The charging-current regulating device recognizes the dropping of the input current of the field device and regulates the charging circuit for the energy storage device in such a manner that the charging current and thus the input current of the field device rise. Thus an input protection circuit of the field device can, for example, be subjected to a constant input current, or can also be utilized to its maximum.

The charging-current regulating device as described above and below may also be utilized to dimension input protection circuits for smaller input currents, because the charging-current regulating device can be designed not only to increase the charging current, but also to limit it to a specifiable maximum value. Quick charging of the energy storage device of the field device is nevertheless possible, because the charging-current regulating device as described above and below is suitable for using any current differential between the actual current draw of an electrical consumer of the field device and the maximum-possible input current of the field device as a charging current for the energy storage device.

Below, exemplary embodiments of the invention are described with reference to the figures.

BRIEF DESCRIPTION OF THE FIGURES

FIG. 1 shows a field device with a charging-current regulating device according to an exemplary embodiment of the present invention.

FIG. 2 shows a field device with a charging-current regulating device according to a further exemplary embodiment of the present invention.

DETAILED DESCRIPTION

Figure 3:
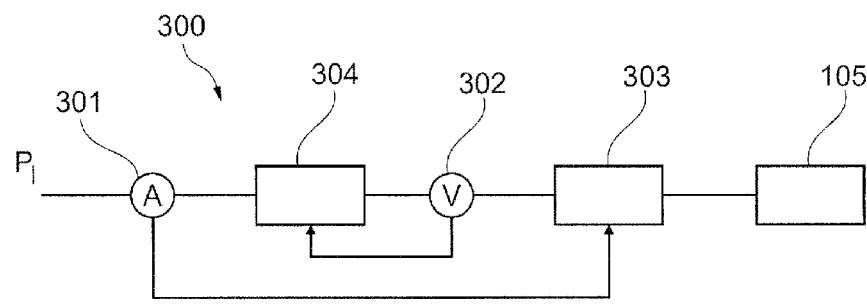
FIG. 3 shows a flow chart of a regulating method according to an exemplary embodiment of the present invention.

The illustrations in the figures are diagrammatical and not to scale.

If in the following description of the figures identical reference characters are used, they relate to identical or similar elements.

FIG. 1 shows a field device 10 according to an exemplary embodiment of the invention. The field device 10 comprises a charging-current regulating device 100, an input protection circuit 101, an energy storage device 105 and an electrical consumer 106.

The charging-current regulating device 100 comprises a regulating unit 102, a control unit 103 and a switching regulator 104.

The field device 10 is supplied with the voltage $U_E$ and the current $I_E$ by way of the input protection circuit 101. The regulating unit 102 receives from the control unit 103 a command variable, namely the setpoint value of the input current $I_E$, and can, by way of a control variable, act on the switching regulator 104 or the electrical consumer 106 in such a manner that either the switching regulator 104 alters a pick-up current $I_L$ or an output current $I_A$, or the electrical consumer 106 alters a current draw $I_V$. The output current $I_A$ of the switching regulator 104 corresponds to the charging current for the energy storage device 105.

The regulating unit 102 can be designed in such a manner that it outputs a control variable to the switching regulator 104 and/or to the electrical consumer 106. The dashed line from the regulating unit 102 to the electrical consumer 106 shows that this control variable is optional. The current draw $I_V$ can be regulated as an alternative or in addition to the pick-up current $I_L$ or the output current $I_A$ of the switching regulator 104.

FIG. 1 shows that the sum of the currents $I_V$ and $I_L$ essentially corresponds to the input current $I_E$. Any differences can be caused by the current draw of the components.

FIG. 2 shows a field device 10 according to a further exemplary embodiment of the invention. The field device 10 comprises an input protection circuit 101, a switching regulator 104, an energy storage device 105 and an electrical consumer 106.

In FIG. 2 the regulating unit 102 is implemented by means of the current sensing resistor R 201 and the operational amplifier 202.

The input current $I_E$ is fed through the input protection circuit and the current sensing resistor 201, wherein as a result of the through-flowing input current $I_E$ the voltage $U_R$ at the current sensing resistor 201 drops. The operational amplifier 202 can be operated with the voltage $U_R$ as an input voltage and is connected to the switching regulator 104 in such a manner that an output signal of the operational amplifier 202 is fed to the switching regulator 104 in such a manner that the switching regulator 104 can adjust the pick-up current $I_L$ or the output current $I_A$ depending on the output signal of the operational amplifier 202 in such a manner that the input current $I_E$ also changes.

The following correlation applies to the input current $I_E$: with a rising input current $I_E$, for example as a result of a rising charging current $I_L$, the voltage $U_R$ on the current sensing resistor R 201 rises, and thus the output signal of the operational amplifier 202, which signal is fed to the switching regulator 104, rises. The higher output signal of the operational amplifier 202 has the effect, in the switching regulator 104, of the pick-up current $I_L$ or the output current $I_A$ dropping, which results in a drop of the input current $I_E$ so that the voltage $U_R$ on the current sensing resistor R 201 also drops, which in turn results in an adjustment of the output signal of the operational amplifier 202.

Of course, the operational amplifier 202 can be switched in such a manner that an output signal of the operational amplifier 202 either behaves so as to be proportional, or so as to be inversely proportional, to the voltage $U_R$. In other words, this means that the output signal of the operational amplifier 202 in the first case also rises with a rising voltage $U_R$ (which at the same time means that a dropping voltage $U_R$ causes a dropping output signal) and in the second case drops as the voltage $U_R$ rises (which at the same time means that a dropping voltage $U_R$ causes a rising output signal).

The switching regulator 104 can be designed in such a manner that it adjusts a pick-up current $I_L$ as described above and below.

Of course, a setpoint value relating to the input current $I_E$ can be specified to the operational amplifier 202, wherein the setpoint value relating to the input current $I_E$ is set indirectly, by way of specifying a reference voltage with which the voltage $U_R$ is compared. Specifying the setpoint value can take place by way of a control unit.

Of course, the operational amplifier 202 can also convey its output signal to the electrical consumer 106, wherein the electrical consumer 106 can be designed in such a manner that this output signal of the operational amplifier 202 can be used as a control variable for adjusting the method of operation of the electrical consumer and thus for adjusting the current consumption and the current draw $I_V$.

Adjusting the method of operation of the electrical consumer as described above and below can, in particular, take place in that a data acquisition rate relating to the measured values is changed, or, optionally, in that energy-intensive calculation and evaluation operations are carried out.

In particular, the current draw of the electrical consumer as described above and below can be reduced if the data acquisition rate is reduced, and/or if energy-intensive calculation and evaluation operations are not carried out, or are carried out only to a reduced extent.

Reducing the data acquisition rate can take place in a stepped or in a stepless manner.

FIG. 3 shows a flow chart of a regulating method 300 according to an exemplary embodiment of the invention.

The current of the power supply $P_I$ is measured by means of a current measuring device 301; it is used as an input value relating to current regulating 303. A voltage value, measured by means of the voltmeter 302, is used as an input value relating to voltage regulation 304. By way of the power supply regulated in this manner the energy storage device 105 is charged.

Figures 4A, 4B:
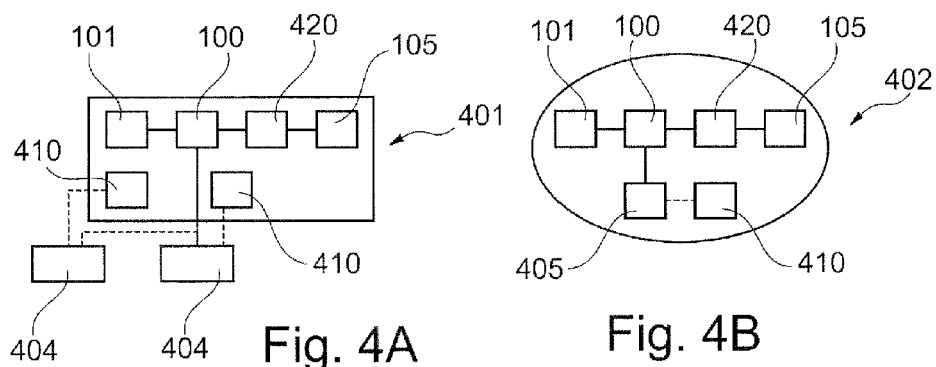
FIG. 4a shows a field device with an electrical consumer according to a further exemplary embodiment of the present invention.
FIG. 4b shows a field device with an electrical consumer according to a further exemplary embodiment of the present invention.

FIG. 4a shows a field device 401 according to an exemplary embodiment of the invention.

The field device 401 comprises an input protection circuit 101, a charging-current regulating device 100, a charging circuit 420, and an energy storage device 105. Furthermore, the field device 401 comprises a fill level sensor 404 and an evaluation unit 410. Of course, the field device 401 can also comprise a multitude of fill level sensors 404 and a multitude of evaluation units 410.

The charging-current regulating device 100 regulates the charging current for charging the energy storage device 105 so that the sum of the charging current and a current draw of the fill level sensors 404 and of the evaluation units 410 does not exceed the maximum-permissible value of an input current of the field device.

The field device 401 can also be locally spaced apart from the fill level sensors 404, wherein the fill level sensors 404 can transmit the measured values in a wireless or wire-bound manner to the evaluation units 410.

FIG. 4b shows a field device 402 according to a further exemplary embodiment of the invention. The field device 402 comprises an input protection circuit 101, a charging-current regulating device 100, a charging circuit 420, an energy storage device 105, a pressure sensor 405 and an evaluation unit 410.

Like the field device 401, the field device 402 also can comprise a multitude of pressure sensors 405 and a multitude of evaluation units 410.

In all the field devices 10, 401, 402, 403 as described above and below, the charging-current regulating device 100 can, of course, be used to regulate both the charging current for the energy storage device 105 and the current draw of the electrical consumer, for example of the sensors 404, 405, 406 and of the evaluation unit 410.

Figure 4C:
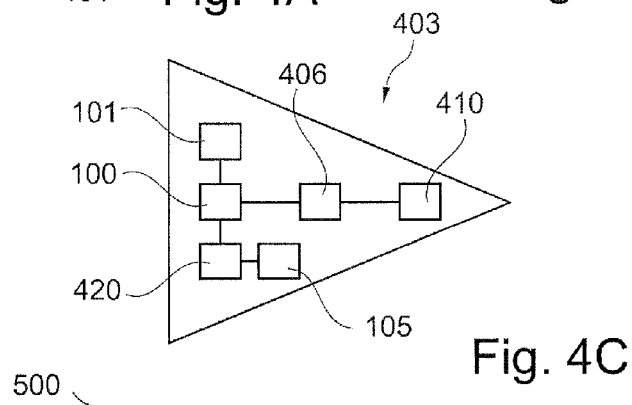
FIG. 4c shows a field device with a further electrical consumer according to an exemplary embodiment of the present invention.

FIG. 4c shows a field device 403 according to a further exemplary embodiment of the invention.

The field device 403 comprises an input protection circuit 101, a charging-current regulating device 100, an energy storage device 105, a charging circuit 420, a flow sensor 406, and an evaluation unit 410.

The charging circuit 420 as described above and below, together with the switching regulator 104, is used to supply the energy storage device 105 with charging current.

Of course, a field device as described above and below, can also comprise different sensors, for example a pressure sensor, a flow sensor and a fill level sensor. The measured values of the sensors can be acquired, processed and forwarded either by one evaluation unit 410 or by several evaluation units 410.

Figure 5:
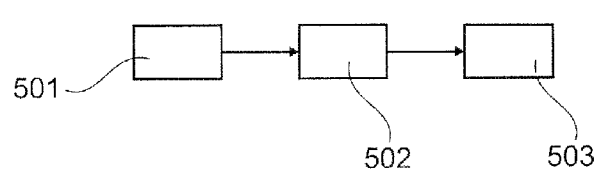
FIG. 5 shows a flow chart of a method for charging-current regulating according to an exemplary embodiment of the present invention.

FIG. 5 shows a method 500 for regulating a charging current according to an exemplary embodiment of the invention.

In a first step 501 acquiring an input current $I_E$ takes place. This is followed in a second step 502 by regulating a charging current $I_L$ wherein the sum of the charging current $I_L$ and of a current draw $I_V$ of an electrical consumer essentially corresponds to the input current $I_E$ of a field device, and the input current $I_E$ of a field device does not exceed a specifiable limiting value. In a third step 503 regulating the current draw $I_V$ of an electrical consumer takes place so that the input current $I_E$ of a field device does not exceed a maximum value.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A field device, comprising:
   an input protection circuit limiting an input current load of the field device to a specifiable input current $I_E$;
   at least one electrical consumer;
   an energy storage device supplying the electrical consumer with electrical power and a current draw $I_V$;
   a charging circuit supplying the energy storage device with energy so that the energy storage device stores the supplied energy; and
   a charging-current regulating device regulating a charging current $I_L$ fed to the charging circuit for charging the energy storage device so that a limiting value relating to the input current $I_E$ that flows through the input protection circuit is not exceeded,
   wherein a sum of the charging current $I_L$ fed to the charging circuit and the current draw $I_V$ of the electrical consumer corresponds to the input current $I_E$ of the input protection circuit.

2. The field device according to claim 1, wherein the energy storage device is a unit of rechargeable batteries and wherein the unit of rechargeable batteries includes at least one rechargeable battery.

3. The field device according to claim 1, wherein the electrical consumer is a fill-level measuring device.

4. The field device according to claim 1, wherein the electrical consumer is a flow measuring device.

5. The field device according to claim 1, wherein the electrical consumer is a pressure measuring device.

6. The field device according to claim 1, wherein the current draw $I_V$ of the electrical consumer is altered in such a manner that the charging current $I_L$ follows a specifiable value.

7. The field device according to claim 6, wherein the specifiable value relating to the charging current $I_L$ is kept constant.

8. The field device according to claim 1, wherein the charging-current regulating device includes a current sensing resistor R; an operational amplifier; a switching regulator;
   wherein the input current $I_E$ flows through the current sensing resistor R, and consequently a corresponding voltage $U_R$ drops at the current sensing resistor R;
   wherein the operational amplifier is operated with the voltage $U_R$ as the input voltage;
   wherein an output voltage of the operational amplifier is fed to the switching regulator and controls the switching regulator in such a manner that a pick-up current $I_L$ or an output current $I_A$ of the switching regulator can be altered; and
   wherein the switching regulator is controlled by the operational amplifier in such a manner that the pick-up current $I_L$ or the output current $I_A$ of the switching regulator is altered in such a manner that the input current $I_E$ flowing through the current sensing resistor R does not exceed the limiting value of the input current $I_E$.

9. The field device according to claim 8, wherein the operational amplifier is switched as a differential amplifier so that a voltage differential present at two inputs of the operational amplifier is output, weighted by an amplification factor, at an output of the operational amplifier.

10. The field device according to claim 8, wherein the current sensing resistor R is an ohmic resistor.

* * * * *